United States Patent [19]
Phillips

[11] Patent Number: 5,421,547
[45] Date of Patent: Jun. 6, 1995

[54] INLINE VALVE

[75] Inventor: Edwin D. Phillips, North Plainfield, N.J.

[73] Assignee: Scientific Machine and Supply Company, Middlesex, N.J.

[21] Appl. No.: 124,630

[22] Filed: Sep. 22, 1993

[51] Int. Cl.6 .......................... F16K 41/00; F16K 31/50
[52] U.S. Cl. ...................................... 251/122; 251/214; 251/215; 251/225; 251/335.3; 277/110; 285/354; 285/911
[58] Field of Search ................ 251/122, 214, 215, 218, 251/223, 225, 335.3, 368; 277/110, 112, 147, 165; 285/346, 354, 355, 911

[56] References Cited

U.S. PATENT DOCUMENTS

| 1,527,154 | 2/1925 | Mallory et al. | 251/335.3 |
|---|---|---|---|
| 2,988,321 | 6/1961 | Gilmont | 251/225 |
| 3,185,437 | 5/1965 | Rice | 251/327 |
| 3,490,736 | 1/1970 | Snyder | 251/215 |
| 3,528,087 | 9/1970 | Perkins | 251/335.3 |
| 3,589,677 | 6/1971 | Segers | 251/215 |
| 3,658,290 | 4/1972 | Peters et al. | 251/215 |
| 3,747,894 | 7/1973 | Pepper | 251/215 |
| 4,030,695 | 6/1977 | Curtis | 251/122 |
| 4,270,727 | 6/1981 | Norman | 251/63.4 |
| 4,382,579 | 5/1983 | Morris | 251/214 |
| 4,535,969 | 8/1985 | Riley | 251/215 |
| 4,556,196 | 12/1985 | Nimberger | 251/214 |
| 4,669,763 | 6/1987 | Phillips | 285/354 |
| 4,907,780 | 3/1990 | Phillips | 251/225 |
| 5,000,215 | 3/1991 | Phillips | 251/335.3 |
| 5,083,749 | 1/1992 | Linderman et al. | 251/214 |

Primary Examiner—George L. Walton
Attorney, Agent, or Firm—Shoemaker and Mattare, Ltd.

[57] ABSTRACT

An inline valve includes a glass body having an upwardly open bore with a tapered seating surface, and colinear inlet and outlet ports having passages intersecting the seating surface. Fluid flow between the ports is regulated by a valve member whose stem has a tapered tip conforming substantially in shape to that of the seating surface. The tip has a relatively soft surface which can conform to irregularities in the seating surface when the valve is closed. An annular seal or an extensible boot prevents fluid leakage along the valve stem.

5 Claims, 2 Drawing Sheets

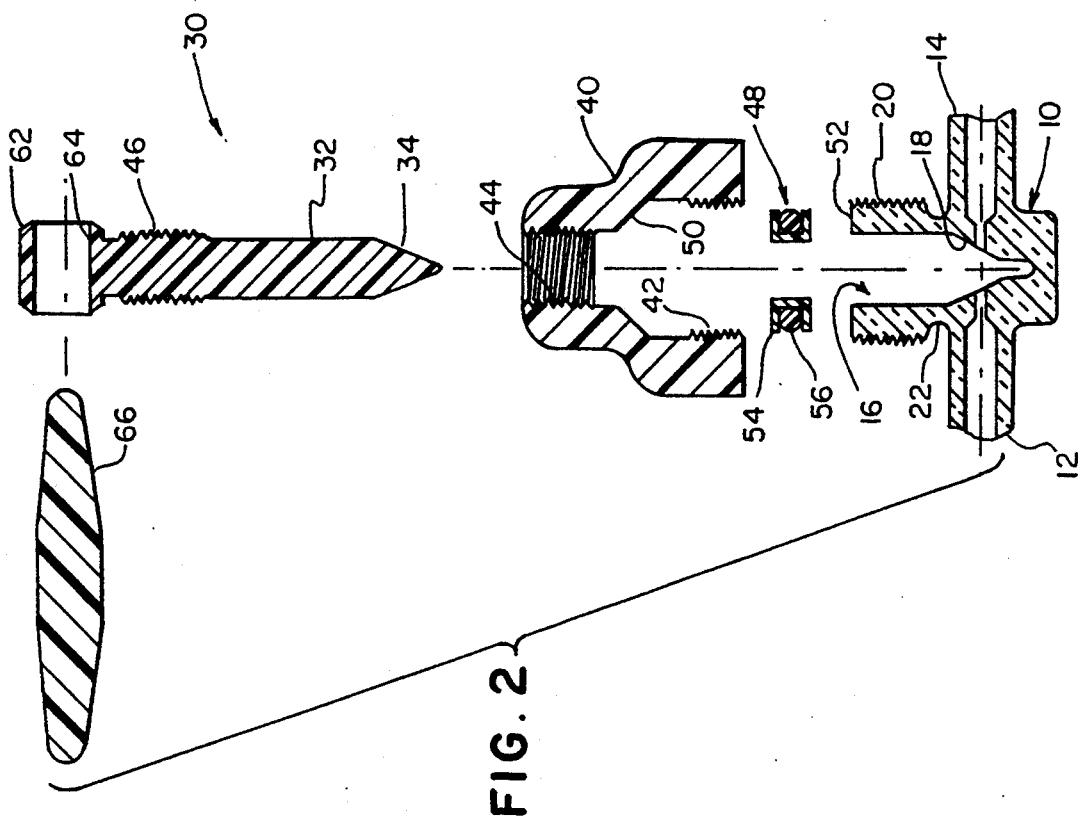
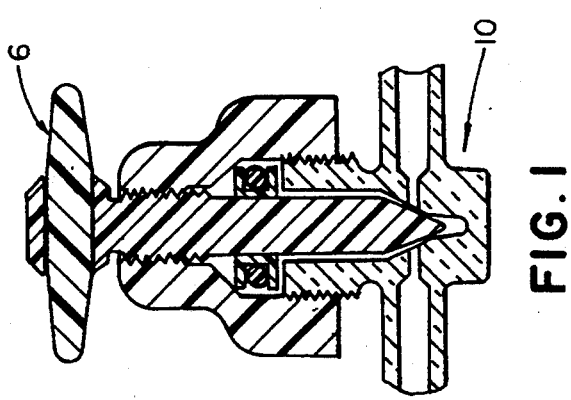
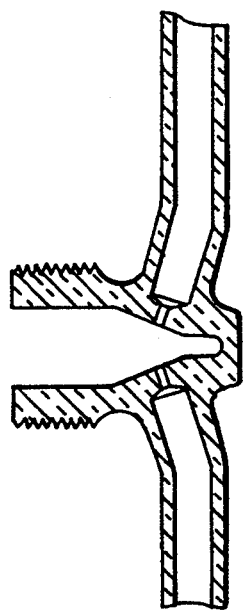

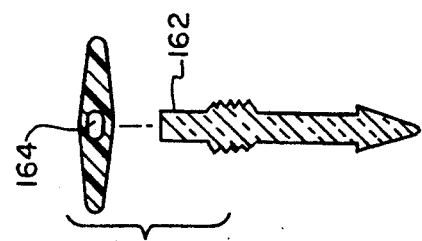
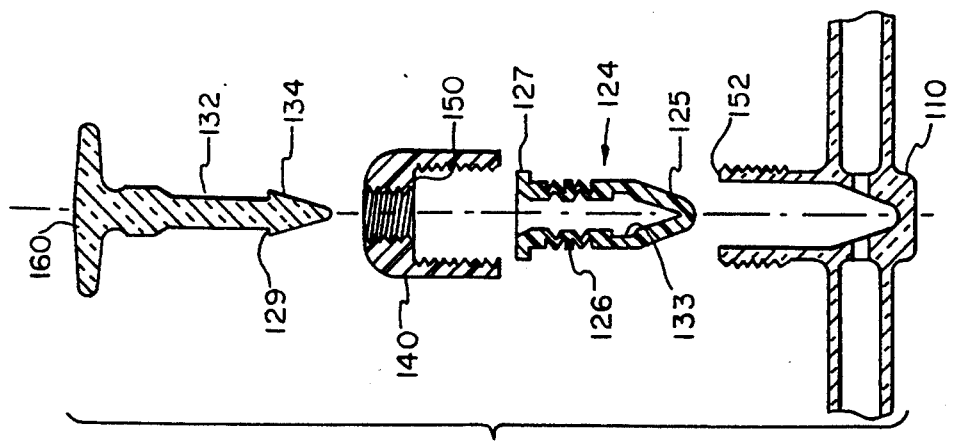
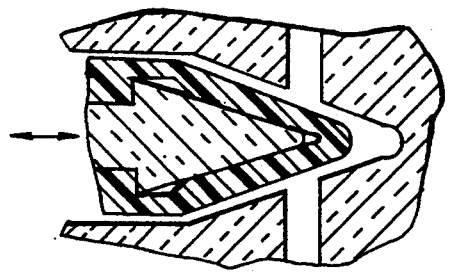
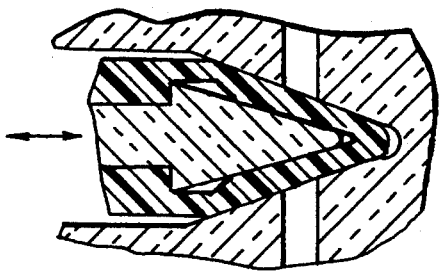
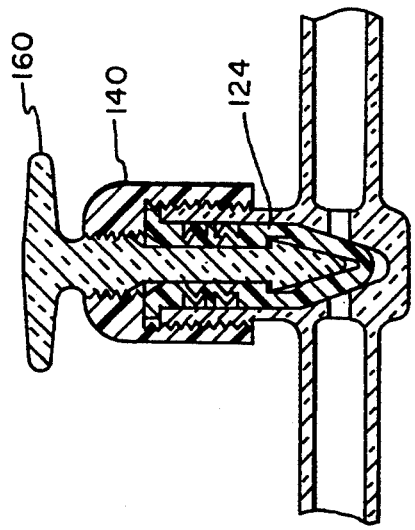

A handle 60 is provided at the top of the valve stem.

INLINE VALVE

BACKGROUND OF THE INVENTION

This invention relates generally to valves and more particularly to an inline stopcock having a glass body and a polymeric valve head.

Stopcocks may be used to control the flow of dangerous and toxic liquids. The glass bodies of stopcocks and other valves now in use require the male and female sealing surfaces to be ground and polished in order to produce a satisfactory seal. These grinding operations require a skilled machine operator and a great deal of time.

To serve as a stopcock replacement, a valve must have its inlet and outlet ports inline, that is, extending along a common axis, and the rotational movement required to move the valve head from its fully open position to a fully closed position must be small.

It is an object of this invention to produce an inline valve in which the sealing surfaces do not require precision grinding to effect a satisfactory seal. Another object is to produce a superior valve to replace a stopcock, but not limited to that use.

SUMMARY OF THE INVENTION

These and other objects are attained by an inline valve which includes a glass body having an upwardly open bore with a tapered seating surface, and colinear inlet and outlet ports having passages intersecting the seating surface. Fluid flow between the pores is regulated by a valve member whose stem has a tapered tip conforming substantially in shape to that of the seating surface. The tip has a relatively soft surface which can conform to irregularities in the seating surface when the valve is closed. An annular seal or an extensible boot prevents fluid leakage along the valve stem.

BRIEF DESCRIPTION OF THE DRAWINGS

In the accompanying drawings,

FIG. 1 is a cross-sectional view, taken on a vertical plane of symmetry, of a valve embodying the invention;

FIG. 2 is an exploded view thereof;

FIG. 3 is a cross-sectional view showing an alternative form of the body of the valve;

FIG. 4 is a cross-sectional view of another embodiment of the invention;

FIG. 5 is an exploded view thereof;

FIG. 6 is an exploded view of an alternate form of the valve stem thereof; and

FIGS. 7 and 8 are enlarged views of a portion of FIG. 4, showing the valve in closed and open positions, respectively.

DESCRIPTION OF THE PREFERRED EMBODIMENT

An inline valve embodying the invention, as shown in FIG. 1, includes a pyrex glass body 10 having an inlet port 12 and an outlet port 14 extending along a common horizontal axis "H". The body has an upwardly open cylindrical bore 16 ending at a frustoconical seat 18. A recess is formed around the apex of the seat's surface, for manufacturing ease. The upper end of the body has external threads 20, bounded below by a circumferential relief 22. Each of the ports 12,14 defines a flow passage whose diameter is substantially reduced near the intersection with the seat surface. Variations in port design are possible—FIGS. 3 and 4, for example, show two variations.

Fluid flow between the ports is controlled by a valve member 30 comprising a stem 32 terminating at a conical tip 34. The geometry of the tip conforms substantially to that of the seat 18, that is, it has about the same apex angle. The stem is slightly smaller in diameter that the bore 16, so that the stem can move freely.

The stem is made of a relatively soft polymeric material such as Nylon. Other materials can be substituted, depending on the chemical nature of the fluid to be handled by the valve. Because it is relatively soft, the tip distorts or flows, when the valve is closed (FIG. 8), to conform to irregularities in the surface of the valve seat, which is substantially rigid. Therefore, neither the tip nor the seat needs to be precision ground, and each can be used in its as-cast or as molded form.

The valve stem is retained in the body by a hollow cap 40 having lower internal threads 42 that mate with the threads 20, and upper internal threads 44 that mate with external threads 46 near the upper end of the valve stem. The cap is made from a strong, stable plastic material; I presently prefer Celcon (a trademark of Celanese Corporation for an acetyl copolymer).

An annular seal 48 is sandwiched between the a frustoconical surface 50 within the cap and the upper end surface 52 of the valve body; this seal includes a PTFE U-section annular shell 54 containing a rubber O-ring 56. The seal diameter is chosen so that, when the seal is axially compressed by screwing down the cap, the shell bears against the valve stem and prevents fluid leakage along it. The purpose of providing the PTFE shell around the O-ring is to protect the O-ring material from attack by the liquid being handled. Thus protected, the O-ring material can be chosen for its mechanical characteristics such as compressibility and temperature range, without compromising for chemical considerations.

A handle 60 is provided at the top of the valve stem. I presently prefer to form an enlargement 62 at the upper end of the stem, with a horizontal through hole 64, and to press a T-handle 66, made of ultra-high molecular weight polyethylene, through the hole, as suggested by FIG. 2. It is possible, however, to form the handle integrally with the stem, or to form a hole in the handle, and press it onto the end of the valve stem, as suggested by FIG. 6.

A second embodiment of the invention is illustrated in FIGS. 4 and 5. In this embodiment, both the valve stem 132 and the valve body 110 are made of pyrex glass. The valve tip 134 does not contact its seat 118 directly, being separated therefrom by an upwardly open PTFE or nylon boot 124 having a tapered nose 125, an extensible intermediate bellows portion 126, and an external sealing flange 127 at its upper end.

Note that the tip 134 of the valve has a base diameter larger than the stem diameter, so that there is a small upwardly-facing annular shoulder 129. The nose of the boot 124 has a corresponding shoulder at the top of a circumferential internal relief 133; these shoulders retain the boot on the valve tip, facilitating assembly.

The bellows 126 further comprises a series of circumferential corrugations designed to enable the bellows to stretch a distance at least equal to the stroke of the valve tip.

When the cap 140 is screwed onto the body 110, the boot flange 127 is compressed between the top end surface 152 of the valve body, and an internal shoulder 150 in the cap. Even though the valve tip and the seat are made of glass, the boot nose has a sufficiently thick wall to provide adequate compliance to conform to irregularities in the surfaces of the glass parts on either side, when the valve is closed.

The valve member shown in FIGS. 4 and 5 has an integral glass handle 160; however, one could make the handle separately, from a different material, as illustrated in FIG. 6. In this case, the upper end of the stem has a non-circular cross-section 162, and the handle has a hole 164 of a similar, slightly smaller shape. The handle is then pressed onto the end of the stem.

Since the invention is subject to modifications and variations, it is intended that the foregoing description and the accompanying drawings shall be interpreted as illustrative of only one form of the invention, whose scope is to be measured by the following claims.

I claim:

1. An inline valve comprising
   a glass body having an upwardly open bore defined in part by a tapered seating surface, and colinear inlet and outlet ports having passages intersecting the seating surface,
   a glass valve member having a stem with a tapered tip conforming substantially in shape to that of the seating surface, for controlling fluid flow between said inlet and outlet ports,
   a handle for turning the valve member,
   a cap for retaining the valve member in the bore,
   said cap and said stem having mating helical threads thereon so that the valve member can be advanced toward said seat by turning it, and
   a flexible boot having (a) closed nose which completely envelops the valve tip, for engaging the tapered seat and surface, (b) an extensible bellow section surrounding the stem, for sealingly engaging the valve stem and the bore and being disposed above said closed nose, and (c) an upper open end for insertion of the valve within the flexible boot and being disposed above said extensible bellows, said upper end being surrounded by an external flange which is clamped and compressed between said cap and said glass body with increasing force as the cap is screwed onto the body to permit the extensible bellows' sealing engagement to be increased, thereby preventing leakage along the stem.

2. The invention of claim 1, wherein the boot is made of PTFE.

3. The invention of claim 1, wherein the valve stem has an enlargement at its upper end, with a horizontal hole extending through the englargement, and said handle is mounted in said hole.

4. The invention of claim 1, wherein the valve stem has a non-circular upper end, and said handle has a correspondingly shaped vertical hole which received the valve stem end.

5. The invention of claim 1, wherein the valve tip has an upwardly facing annular shoulder at its base, and the boot nose has a downwardly facing shoulder of like size, whereby the tip may be pushed into the boot nose, and the shoulders thereafter retain the boot on the valve tip.

* * * * *